Dec. 30, 1941.  W. H. COLBERT  2,268,189
MIRROR
Filed April 15, 1939   3 Sheets-Sheet 1
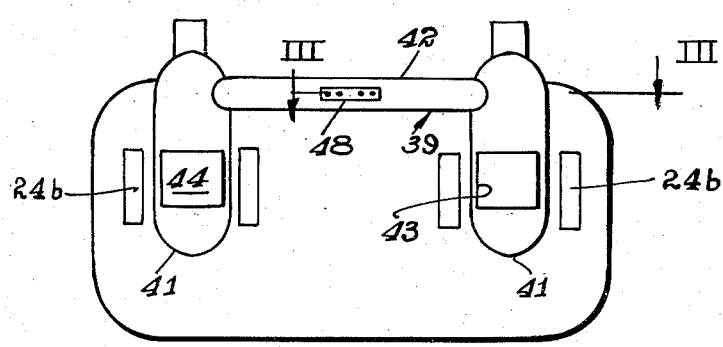
Fig. 1.
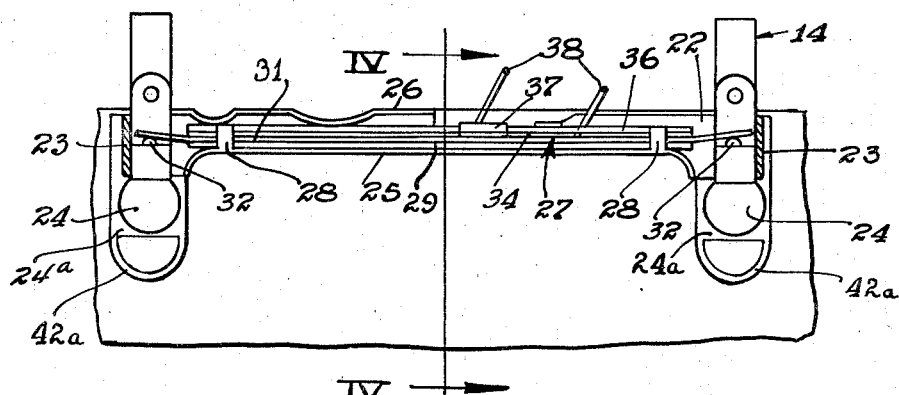
Fig. 2.
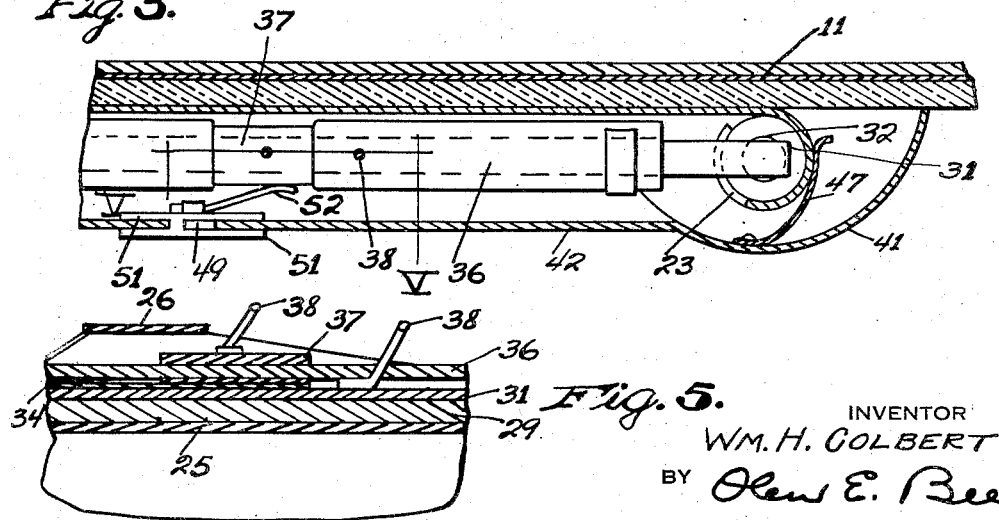
Fig. 3.
Fig. 5.
INVENTOR
WM. H. COLBERT
BY Olew E. Bee
ATTORNEY Dec. 30, 1941.  W. H. COLBERT  2,268,189
MIRROR
Filed April 15, 1939   3 Sheets-Sheet 2
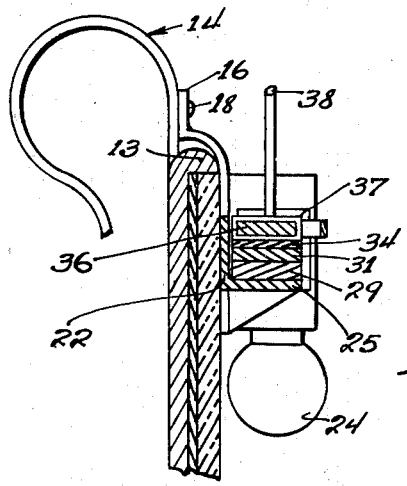
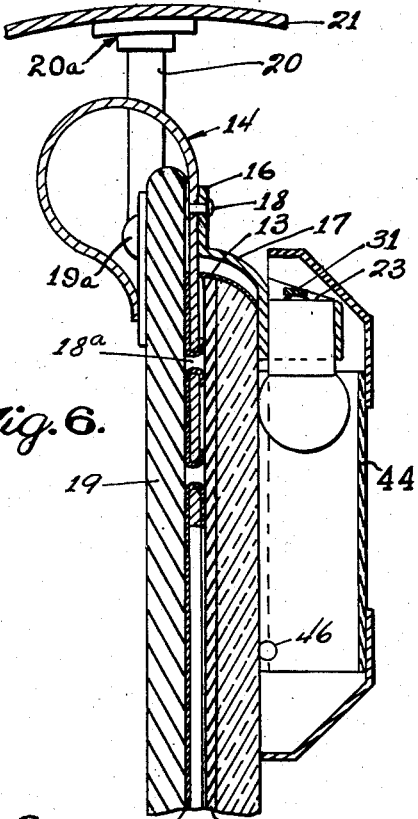
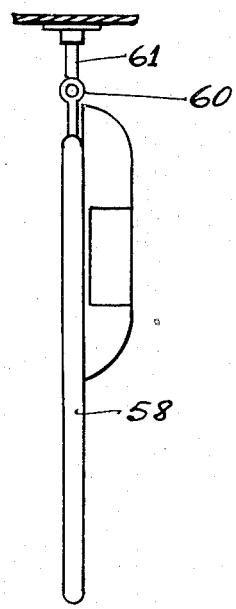
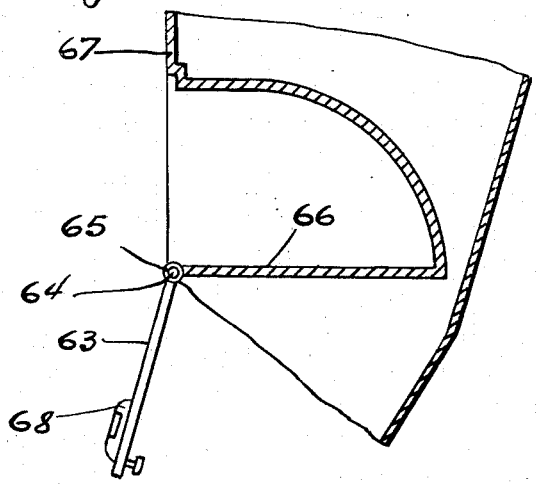
INVENTOR
WM. H. COLBERT
BY Olen E. Bee
ATTORNEY Dec. 30, 1941.  W. H. COLBERT  2,268,189
MIRROR
Filed April 15, 1939  3 Sheets-Sheet 3

INVENTOR
WM. H. COLBERT
BY Olew E. Bee
ATTORNEY

Patented Dec. 30, 1941

2,268,189

UNITED STATES PATENT OFFICE 2,268,189

MIRROR

William H. Colbert, Brackenridge, Pa.

Application April 15, 1939, Serial No. 267,994

7 Claims. (Cl. 240—4.2)

The present invention relates to mirrors notably of the type employed in automotive vehicles for vanity or make-up purposes.

One object of the invention is to provide an improved system of illumination for use in combination with vanity mirrors.

A second object of the invention is to provide improved mounting means for securing or suspending mirror plates in vehicles.

A third object is to provide simple and efficient means for securing the illuminating devices to the mirror plate.

These and other objects of the invention will be apparent from consideration of the following specification and the appended claims.

The provision of satisfactory illumination for vanity or make-up purposes in automotive vehicles has heretofore been relatively difficult. Usually such illumination has been provided by means of dome lights or similar lights built into or attached to the roof or body structure of the vehicles. Automobile batteries are of limited capacity and therefore out of necessity it was necessary to restrict the candle power of the lights to such value as to produce but feeble illumination unsatisfactory for use by occupants of the vehicle for make-up purposes. Moreover, the lights produced reflections in the windshield which were objectionable to the driver when the vehicle was in motion.

The present invention contemplates as one feature the provision of a mirror which carries a source of illumination directly attached to the face thereof in such manner as to project its light immediately upon the face of the user.

For a better understanding of the invention reference may now be had to the accompanying drawings in which like numerals refer to like parts throughout.

Figure 1 of the drawings is an elevational view of a preferred form of the invention.

Figure 2 is a fragmentary view partially in cross-section and partially in elevation illustrating the system for illuminating the field of the mirror.

Figure 3 is a fragmentary cross-sectional view taken substantially upon the line III—III of Figure 1.

Figure 4 is a fragmentary cross-sectional view taken substantially upon the line IV—IV of Figure 2.

Figure 5 is a fragmentary cross-sectional view taken substantially upon the line V—V of Figure 3.

Figure 6 is a fragmentary cross-sectional view illustrating the mirror positioned upon the sun visor of an automobile.

Figure 7 is an end view of a mirror mounted as a swingable visor in a car.

Figure 8 is a cross-sectional view showing a mirror mounted as a closure for a glove compartment.

Figure 9:
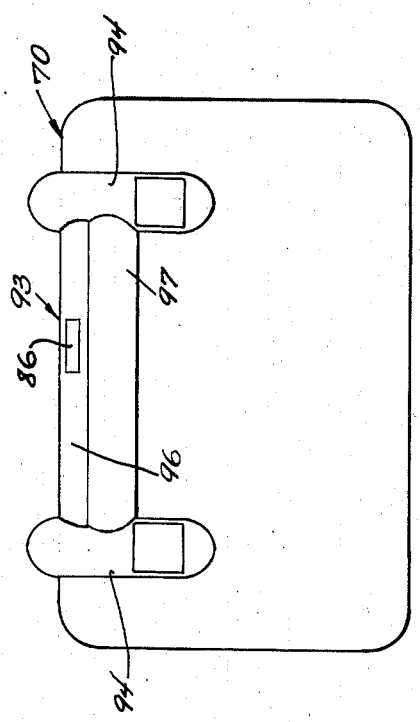
Figure 9 is a plan view of a mirror embodying means for holding an electrical battery.

In the form of the invention shown in Figures 1-6 inclusive, a reflector plate, for example, of glass carrying a film of silver upon the back thereof, is provided with a backing including a layer 11 of cardboard or other material designed to protect the silver film and a metallic covering 12 which at its edges is provided with a flange 13 designed to grip the edge of the plate and to enclose the back of the mirror. Means for suspending the mirror includes hooks 14 having stem portions 16 which are provided with a branch 17 secured thereto by rivets 18. The lower portions of the stems and the branches 17 constitute a bifurcation designed to engage and grip the glass and the backing layer 11. Stems 16 extend through suitable openings in flange 13 and the lower portions are provided with openings in which are struck burrs 18a from the covering 12 in order to secure the hooks from displacement.

The outer extremity of the hook 14, as shown in Figure 6, is downwardly bent and may engage the back of any suitable support, such as sun visor 19, which is mounted to rotate upon horizontal portion 19a of a bracket 20. The bracket also swivels in a socket 20a, attached to a portion, e. g. the roof of a car. It will be apparent that provision is thus made for tilting the mirror about a horizontal axis or rotating it about a vertical axis in order to face it in substantially any direction. It can thus be employed as a mirror by a person of any height or in practically any portion, e. g. the front compartment of the car. It can, also, be swung to illuminate a doorway, or the ground about the doorway, or to illuminate the interior of the car, or to illuminate the interior of a bag, purse or other container, or indeed for illuminating any article or object about the car. When the mirror is supported upon a robe rail, visor, or other support, it of course leaves the hands of the user entirely free to effect desired manipulations of various articles.

The lower extremities of the branches 17 are formed integral with or are interconnected by a metallic bar at the front of the mirror. This bar is so bent at its extremities as to provide sockets for light bulbs 24, which are disposed close to or in contact with the glass so that the mirror acts as a reflector to increase the intensity of the light projected away from the front. A space of the mirror about the bulb as shown in Figure 2 may be left unsilvered and then coated as indicated at 24a, with a suitable coloring or non-specular frosting matter in order to diffuse the light and reduce glare, or to obtain a desired color effect. The coating may also be applied to the face of the mirror if so desired. Suitable designs 24b may be formed by engraving the glass or by application of coloring matter to the surface of the glass, and light passing laterally in the plane of the glass will be diffracted or otherwise bent or dispersed to give an effect of luminescence to the design.

The bar is, also, provided with a lower projecting flange 25 and along a portion of its length with upper flange 26. A combined conductor and switch mechanism 27 is disposed between the flanges and is maintained in position by means of tongues 28 upon the flange 25, which tongues are upwardly bent to grip the element 27. The conductor and switch construction includes a lower bar 29, of fibre-board, or other insulative material disposed directly upon the lower flange 25. Upon the bar 29 is disposed a conductive strip 31 of brass, bronze or other suitable metal which at opposite extremities engages tips 32 of electrical light bulbs 23. A second insulative strip 34 is disposed upon the conductor strip 31 and is further surmounted by a bar or strip 36, which as shown in Figures 2 and 5, is surrounded by a sleeve-like fixed contact element 37 which is insulated from the conductor strip 31 by means of the interposed insulator strip 34. Contact sleeve 37 and conductor strip 31 are connected by means of conductor wires 38 to any suitable source of electrical current, for example, the storage battery of an automobile (not shown).

The transverse bar 22 and the mechanism associated therewith are inclosed in a housing 39, which as shown in Figure 1 includes end shells 41 constituting shades or reflectors enclosing the light sockets 23 and the bulbs therein and a transverse connecting portion 42 enclosing the bar 22. The glass immediately beneath the edge of the shells may be provided with a coating 42a which constitutes a continuation of coating 24a. The reflection of the interior of the shells under the edges of the latter is thus obviated and filament glare is reduced. Shells 41 are formed with openings 43 which are closed by curved plates 44 of translucent or transparent material such as artificial resin, glass or any other suitable light-transmitting medium. The closure plates are held in position in the opening by means of tongues 46 bent upwardly from the edges of the shells 41 to engage and grip the plates.

The housing is held in position upon the mirror plate by means of clips including springs 47, best shown in Figure 3, which are secured to the inner face of the shells 41 and are so curved as resiliently to engage the sockets 23, thus providing excellent electrical contact with the latter.

The housing also carries a switch mechanism which comprises a slide element 48 disposed in a slot 49 in the transverse portion 39 of the housing and including at opposite extremities bifurcated portions 51 engaging the metal of the housing to make electrical contact therewith. The slide also carries a contact tongue or spring 52, which, when the circuit is broken, rides upon the edge of the insulative strip 36, but when the slide is advanced to make contact drops into engagement with the contact sleeve 37. The mode of operation of the construction is self-evident from the foregoing description.

The hooks 14 are simply placed over a suitable support such as the sun visor or the robe rail in the car and the lead wires 38 are connected into battery circuit of the car. Occupants may use the mirror while it is in place or, if preferred, they may remove it from its support and hold it in any position which is convenient.

The advantages inhering in the construction are numerous. For example, it is extremely simple and inexpensive of design. The light shields or covers are readily removable in order to admit of replacement of the bulbs or for purposes of making repairs. The lights are also secured to the mirror plate in such manner as to provide a zone of relatively strong illumination about the mirror where it will most effectively be cast upon the face of the user without tending to produce a glare in the eyes of the operator or other occupants of the vehicle. Moreover, the illumination is sufficiently diffused by the translucent plates 44 to obviate objectionable glare in the eyes of the user. The light is also sufficiently balanced by reason of the use of two sources to obviate objectionable shadows and high lights upon the face of the person using the mirror.

It is of course possible to form the units integral with, or as constituting, the visor 58 in a car. In such case the hooks 14 may be formed as shown in Figure 7 into eyes or loops 60 rotatable upon the visor arm 61, corresponding to the bracket 20. The construction includes shells 62 covering bulbs (not shown) and is otherwise the same as shown in Figures 1 to 6 inclusive and it is not deemed necessary to describe it in further detail.

A hinged structure similar to that shown in Figure 7 may likewise be positioned in other parts of a car than on the visor arm, or other desired structure. One application of this form of the invention is shown in Figure 8 in which the mirror 63 is provided with eyes 64 similar to eyes 60 and these eyes rotate upon pintles 65 at the forward edge of a glove compartment 66 in the instrument panel 67, and constitute a closure in the latter. In this structure shells or covers 68 corresponding to the covers 41 are provided upon the forward face of the mirror, so that when the mirror is swung downwardly to open the compartment, the lighting system is faced outwardly. The mirror may be swung about its horizontal axis to any desired position.

Use of the mirrors is not limited to automotive vehicles. On the contrary they may be employed as toilet mirrors upon dressing tables or any other desired place. If the mirrors are so employed the light bulbs in the electrical system thereof may be replaced by bulbs of sufficient resistance to withstand ordinary house lighting current. In event that it is desired to employ battery current for lighting the bulbs suitable carriers for batteries may be provided. For example, a battery of appropriate number of cells may be housed in a hollow handle for the mirror.

Figure 10:
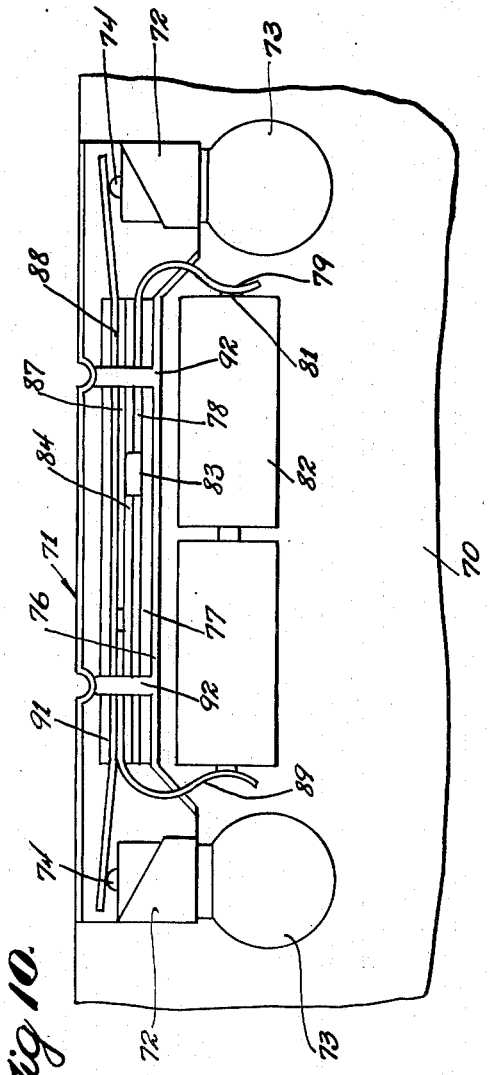
Figure 10 is a fragmentary view of the electrical system of the mirror shown in Fig. 9.

The housing for the electrical system may also be formed to enclose a battery. A simple construction of this type suitable for use as purse or hand bag mirror is disclosed in Figures 9 and 10 in which is shown a mirror 70 having a suitable backing (not shown) and carrying at the upper edge of its forward face a bar 71 similar to the bar 26 shown in Figure 2. The bar at its extremities is provided with sockets 72 for light bulbs 73 having tips 74. A flange 76 along the lower edge of the bar supports alternate bars or strips of conductive and insulative material including a bar 77 of fibrous insulative material upon which rests a strip 78 of springy conductive material such as brass and having a downwardly-bent portion 79 contacting with the pole 81 of a galvanic cell 82. The strap 78 is provided with lips or lugs 83 bent about a second bar 84 of insulative material. The lips constitute contact points, identical in function to sleeve 37 of Figures 2 and 3, for a switch mechanism 86 shown in Figure 10 corresponding to switch 48 in Figure 1.

An insulative bar 87 rests upon the strip 78 and separates the latter from a conductive strip 88 of springy brass, or bronze, the extremities of which rest upon the tips 74 of the light bulbs. The latter strip is further provided with a downwardly-extending springy finger 89 which engages and makes contact with the bottom of the rear of the cells 82, in order to establish an electrical circuit. Insulative bar 91 disposed upon strip 88 protects the latter from possible short circuit. The strips or bars described may be positively secured in position by means of tongues or lugs 92 integral with the flange 76 and bent upwardly about the assembly of bars.

The electrical system is enclosed by housing 93, in general corresponding to the housing 39 already described and including end shells 94 enclosing the bulbs and having a transverse connecting portion 96 housing the bar 71, together with the attendant conductors and insulative strips. This intermediate portion also carries the switch 86. The intermediate portion includes an enlarged portion 97 at its lower edge for a housing of the dry cells 82.

The forms of the invention herein shown and described are to be regarded as merely illustrative, numerous modifications may be made therein without departure from the spirit of the invention or the scope of the appended claims.

What I claim is:

1. A mirror construction embodying a glass reflective plate, a bar secured upon the face of, and one edge of the plate, said bar being provided at opposite ends with portions providing sockets for electrical lights at the face of the plate, whereby the plate acts as a reflector for the lights, means for supplying electrical current to the sockets, a housing comprising shells adapted to enclose the sockets and the electrical lights therein, said shells being interconnected by a transverse portion enclosing the bar and means to secure the housing in position.

2. A construction as defined in claim 1 in which said securing means embodies clips engaging the sockets.

3. A construction as defined in claim 1 in which the transverse portion of the housing is provided with an electrical switch for controlling the admission of exciting current to the lights.

4. An illuminated mirror construction embodying a reflective plate, a transverse bar clamped upon the front of the plate adjacent to one edge thereof, said bar being provided at its extremities with sockets receiving electrical illuminating bulbs, a conductor secured to the bar and interconnecting the tips of the bulbs and being connected in circuit with one lead for a source of current, a housing of electrically conductive material and comprising shells enclosing the sockets and the bulbs therein, and having windows for emission of light, said housing comprising a transverse portion interconnecting the shells and enclosing the transverse bar, the shells being provided with electrically conductive clips engaging the sockets simultaneously to hold the housing in place and to provide a conductor from the switch to the sockets, an electrical contact point of a switch mechanically secured to the bar but being electrically insulated therefrom, and also being connected in circuit with the second lead from said source of current, a manually movable switch element secured in an opening in the transverse portion of the housing and having electrical contact therewith, said switch element carrying a contact point adapted selectively to engage and disengage the contact point on the bar, the housing further being electrically connected to the sockets whereby to supply electrical current to the bulbs when the switch contact point is in engagement with the contact point upon the transverse bar.

5. A construction as defined in claim 4 in which the bar is further secured to attaching hooks adapted to hook over the upper edge of a sun visor within an automobile.

6. A vanity mirror assembly for attachment to an adjustable glare screen in an automobile body, said assembly comprising a mirror plate, attaching hooks secured to the plate at the upper edge thereof, a bar mounted upon the front face of a mirror plate at the upper edge thereof, and being secured to said hooks, electric light sockets disposed at the ends of the bar and opening downwardly, a conductor upon the bar connecting the sockets to a source of electric current, a metallic covering for the bar comprising enlarged shell portions at the extremities thereof adapted to enclose the sockets and electrical bulbs disposed in the sockets, said enlarged portions having openings formed therein for the transmission of light and diffusion members disposed in the openings, a spring clip composed of electrically conductive material secured in each shell portion and hooking over the corresponding socket to secure the cover in position, whereby the two clips together maintain the cover in position and also provide an electrical circuit to the sockets, the portion of the cover over the bar being provided with an opening, a slide element disposed in the opening and being in electrical contact with the covering, the slide element being provided with a contact point, and an electrical contact point secured upon the bar in position to be engaged by the first point and being connected to a source of current.

7. An illuminated mirror assembly embodying a mirror plate, a backing secured upon the plate, hooks for securing the assembly to an automobile visor, attached to the backing, a bar disposed upon the face of the plate at the upper edge thereof and being attached to the hooks, said bar being provided at its extremities with sockets for electrical light bulbs, and electrical conductors secured to the bar for supplying current to the sockets.

WILLIAM H. COLBERT.